US005471662A

United States Patent [19]

Shiota

[11] Patent Number: 5,471,662

[45] Date of Patent: Nov. 28, 1995

[54] RADIO DATA SYSTEM RECEIVER

[75] Inventor: Shinichi Shiota, Tokyo, Japan

[73] Assignee: Sony Corporation, Tokyo, Japan

[21] Appl. No.: 164,281

[22] Filed: Dec. 3, 1993

Related U.S. Application Data

[63] Continuation of Ser. No. 860,916, Mar. 31, 1992, abandoned.

[30] Foreign Application Priority Data

| | | | |
|---|---|---|---|
| Apr. 1, 1991 | [JP] | Japan | 3-094765 |
| Apr. 4, 1991 | [JP] | Japan | 3-099420 |

[51] Int. Cl.$^6$ .......... H04B 1/16

[52] U.S. Cl. .......... 455/166.1; 455/184.1; 455/186.1

[58] Field of Search .......... 381/3, 4; 455/38.1, 455/45, 30, 186.1, 186.2, 208.1, 266, 267, 268, 62, 67.1, 152.1, 166.1, 161.2, 161.3

[56] References Cited

U.S. PATENT DOCUMENTS

| | | | |
|---|---|---|---|
| 195,714 | 8/1889 | Fujimoto | 455/152.1 |
| 4,430,753 | 2/1984 | Shiratani | 455/62 |
| 4,476,582 | 10/1984 | Strauss et al. | 455/186.1 |
| 4,833,728 | 5/1989 | Kimura et al. | 455/186.1 |
| 4,881,273 | 11/1989 | Koyama et al. | 455/186.1 |
| 4,969,209 | 11/1990 | Schwob | 455/186.1 |
| 5,001,775 | 3/1991 | Hayashi et al. | 455/186.1 |
| 5,020,143 | 5/1991 | Duckeck et al. | 455/186.1 |
| 5,065,452 | 11/1991 | Duckeck et al. | 455/186.1 |
| 5,119,507 | 6/1992 | Mankovitz | 455/186.1 |
| 5,128,959 | 7/1992 | Bruckert | 455/67.1 |

FOREIGN PATENT DOCUMENTS

| | | | |
|---|---|---|---|
| 63-136828 | 9/1988 | Japan . | |
| 1054947 | 2/1989 | Japan . | |
| 0060115 | 3/1989 | Japan | 455/152.1 |
| 1276828 | 7/1989 | Japan . | |
| 2244402 | 4/1990 | United Kingdom . | |

OTHER PUBLICATIONS

European Broadcasting Union Technical Centre, *RDS Radio Data System*, pp. 1–20, Jan., 1988, Brussels, Belgium.

*Primary Examiner*—Edward F. Urban
*Attorney, Agent, or Firm*—Lise A. Rode; Robert P. Biddle; Jerry A. Miller

[57] ABSTRACT

An RDS receiver capable of extracting an AF list from the RDS data and selecting a broadcasting station of any of the frequencies on the AF list. The receiver is equipped with functions of selecting, during reception of a desired broadcast of one frequency, a station of the other frequency on the AF list by manipulation of a predetermined key; checking the reception state of the RDS data from the selected broadcasting station; checking the PI code to detect if the result of the preceding check is satisfactory or not; and picking up the broadcast from the selected station upon coincidence of the checked PI code with the PI code of the aforesaid one frequency.

4 Claims, 5 Drawing Sheets

FIG. 3
| | | | | |
|---|---|---|---|---|
| FREQUENCY DIVISION RATIO N | 982 | 983 | - - - - - - - - - - - - | 1187 |
| fo (MHz) | 98.2 | 98.3 | - - - - - - - - - - - - | 118.7 |
| fi (MHz) | 87.5 | 87.6 | - - - - - - - - - - - - | 108.0 |
FIG. 4A
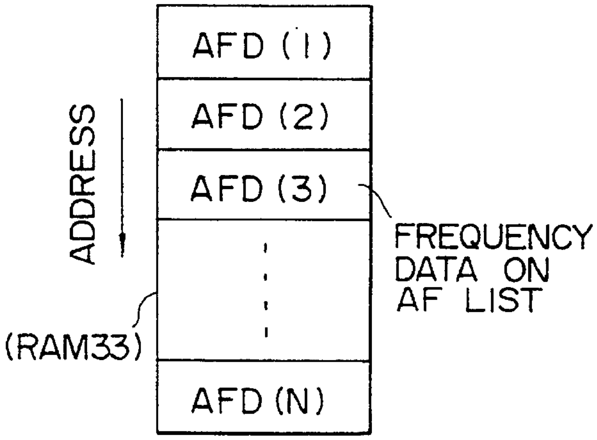
FIG. 4B
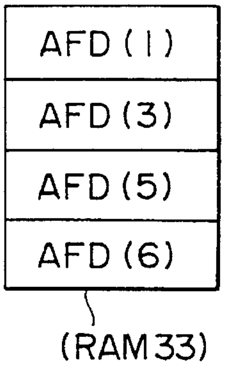
FIG. 5
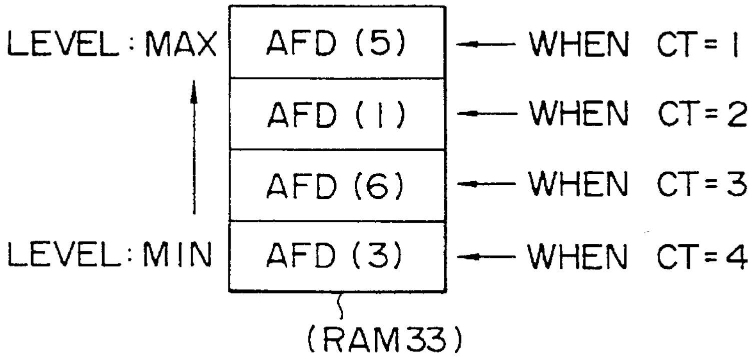

RADIO DATA SYSTEM RECEIVER

This is a continuation of application Ser. No. 07/860,916 filed on Mar. 3, 1992, now abandoned, which is hereby incorporated by reference.

BACKGROUND OF THE INVENTION

1. Field of the Invention

The present invention relates to an RDS (radio data system) receiver and, more particularly, to a receiver adapted to achieve enhanced effects when used in a home radio set.

2. Description of the Prior Art

It is known that, according to FM broadcasting in Europe, RDS data is added to original audio signals.

Such RDS data is an aggregate of digital data relative to broadcasting stations and a program, inclusive of the following:

PI code . . . Program identification code representing a country's name, a program and so forth AF list . . . A frequency list of broadcasting stations transmitting the same program therefrom The RDS data is encoded for error correction, and a subcarrier signal having a frequency of 57 kHz (triple of frequency 19 kHz of a stereo pilot signal) is balance-modulated by the encoded RDS data. Subsequently such modulated signal is added to a monaural signal or a stereo composite signal to be thereby frequency-multiplexed, and the multiplexed FM signal thus obtained is transmitted.

Therefore a specific broadcasting station or a specific program can be received by utilizing the PI code or the AF list included in the RDS data. (Cited reference: "Nikkei Electronics", Aug. 24, 1987)

OBJECT AND SUMMARY OF THE INVENTION

It is an object of the present invention to realize an enhanced operational facility in a receiver for broadcast waves transmitted with such RDS data. The receiver is so contrived that, when the reception state is not satisfactory in the selection of a desired program according to an AF list, the same program being broadcast at a different frequency can be selected and received with certainty and rapidity.

According to one aspect of the present invention relative to an RDS receiver which extracts an AF list from RDS data and selects a broadcasting station of a frequency on the AF list, there is provided an improvement equipped with functions of selecting, during reception of a desired broadcast of one frequency, a station of the other frequency on the AF list by manipulation of a predetermined key, then checking the reception state of the RDS data from the selected broadcasting station, thereafter checking the PI code if the result of the preceding check is satisfactory or not, and tuning in to the broadcast from the selected station upon coincidence of the checked PI code with the PI code of the aforementioned one frequency.

According to another aspect of the present invention relative to the above RDS receiver, there is provided an improvement equipped with functions of first searching, during reception of a desired broadcast of one frequency, stations of a plurality of frequencies on the AF list by manipulation of predetermined keys, then checking the reception states of the RDS data from the searched stations, thereafter checking the PI code to detect if the result of the preceding check is satisfactory or not, subsequently, upon coincidence of the checked PI code with the aforementioned one frequency, storing both the data indicative of the station of such PI code and the reception level of the broadcast waves, and sorting the stored data sequentially in the order of the reception levels, thereby enabling a listener to selectively pickup the broadcast from the station of the frequency at which the reception level is the maximum.

Thus, various checks are executed in the predetermined order of priority on the basis of the data included on the AF list, and one broadcasting station of the frequency decided to be most adequate by the check is selected so that an auditorily optimal station can be picked up.

The above and other features and advantages of the present invention will become apparent from the following description which will be given with reference to the illustrative accompanying drawings.

BRIEF DESCRIPTION OF THE DRAWINGS

FIG. 3 is a diagram to explain reception frequencies;

Figure 6:
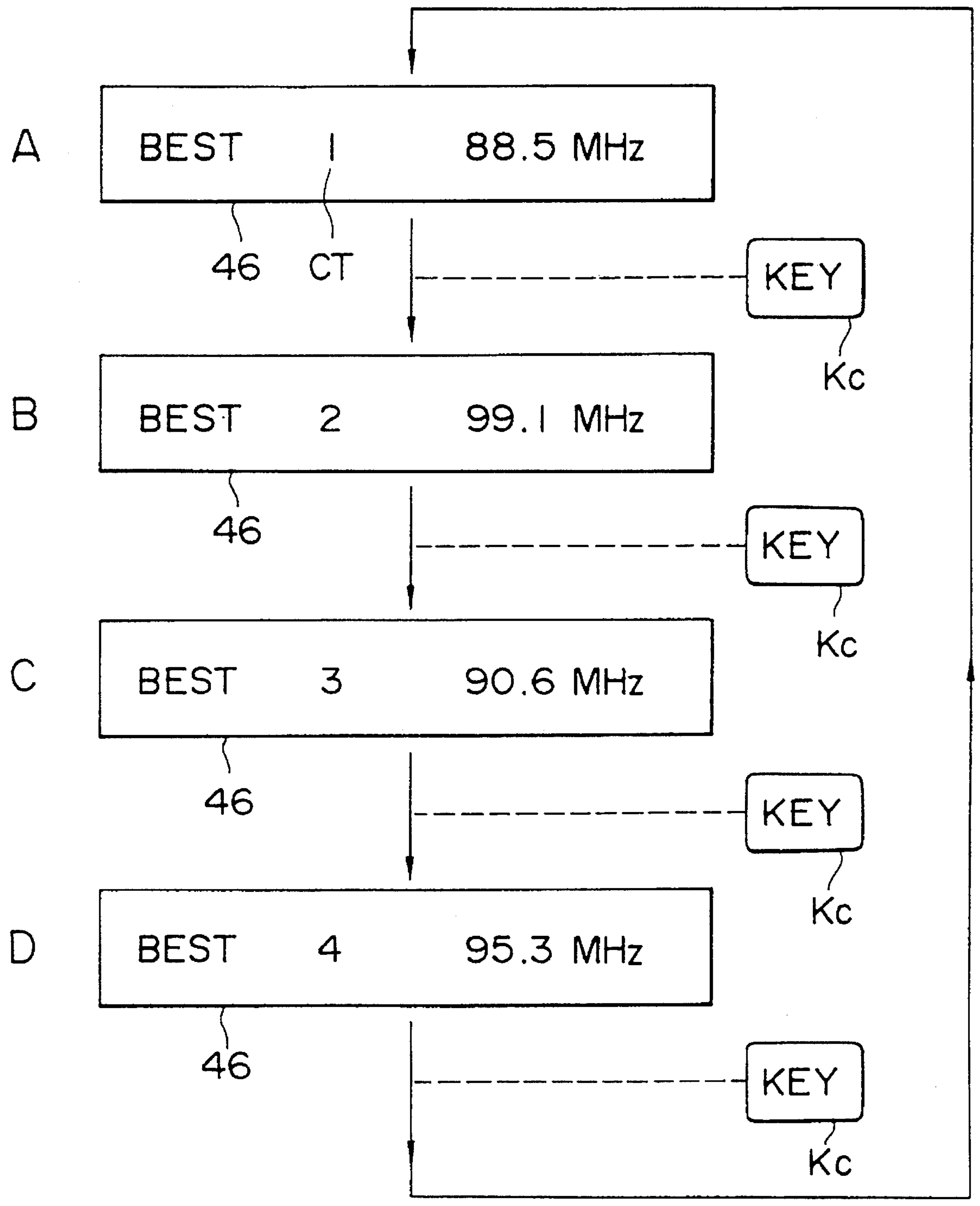
Figure 7:
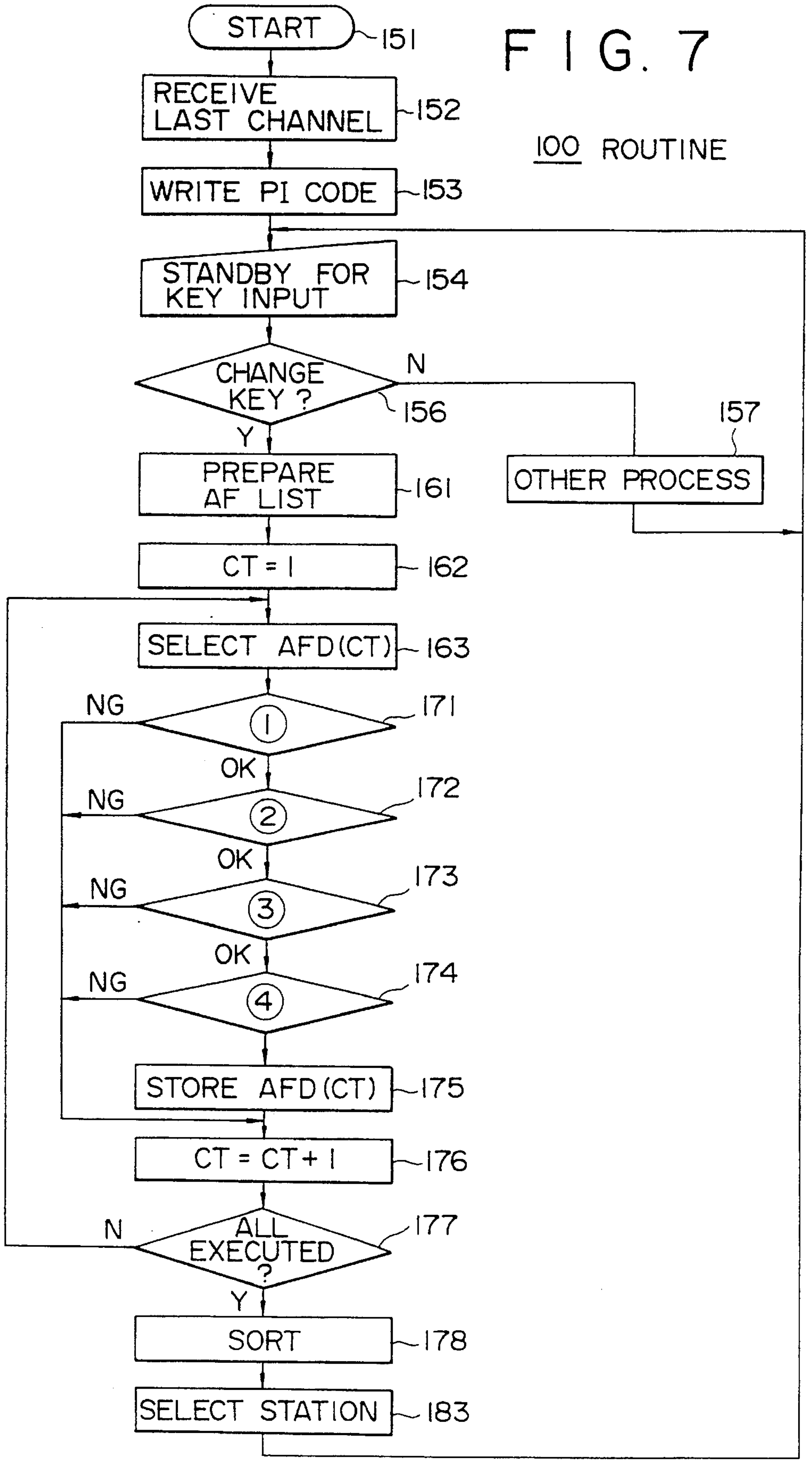

Fig, 4 shows exemplary contents of an AF list;

FIG. 5 shows exemplary results of sorting the contents of the AF list;

FIG. 6 is a front view of an exemplary display state in the present invention; and FIG. 7 is a flow chart of processing steps and contents in another routine executed in the present invention.

DESCRIPTION OF THE PREFERRED EMBODIMENTS

Figure 1:
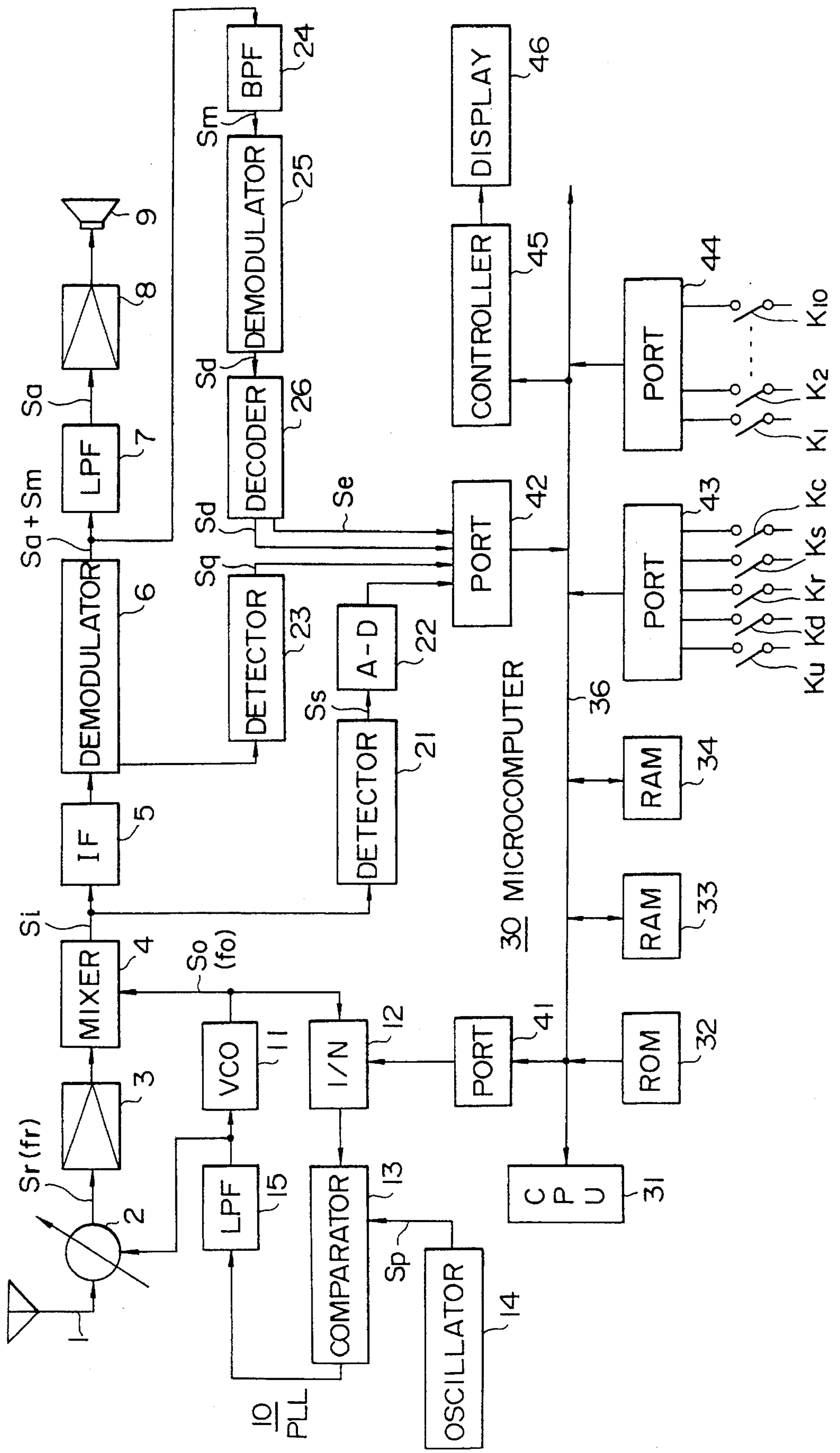
FIG. 1 is a block diagram of an RDS receiver embodying the present invention.

In FIG. 1 are shown an antenna 1 and an electronic antenna tuning circuit 2 which extracts an FM broadcast signal Sr of a desired frequency fr.

The signal Sr is then supplied via a high-frequency amplifier 3 to a mixer 4, while an oscillation signal So having a frequency fo of Eq. (i) given below is outputted from a VCO (voltage-controlled oscillator) 11.

$$fo=fr+10.7\text{ MHz} \qquad (i)$$

The signal So is supplied as a local oscillation signal to the mixer 4, where the signal Sr is frequency-converted to an intermediate frequency signal Si of 10.7 MHz. Subsequently the intermediate frequency signal Si is supplied via an intermediate frequency amplifier 5 to an FM demodulator 6, which then delivers an audio signal (monaural signal or stereo composite signal) Sa and a signal Sm modulated by the RDS data. The signal Sa is supplied via a low-pass filter 7 and a low-frequency amplifier 8 to a loudspeaker 9.

In this stage, the VCO 11 constitutes a PLL (phase-locked loop) 10 in combination with other circuits 12 through 15. The signal So obtained from the VCO 11 is supplied to a variable frequency divider 12 to be demultiplied to a 1/N frequency, and the frequency-divided signal is supplied to a phase comparator 13. Meanwhile an oscillation signal Sp of a reference frequency 100 kHz is outputted from an oscillator 14 and then is supplied also to the phase comparator 13, whose comparison output is supplied as a control voltage to the VCO 11 via a low-pass filter 15. The output voltage of the filter 15 is supplied as a station selecting voltage to the tuning circuit 2.

Therefore, in a steady state where the frequency of the output of the frequency divider 12 and that of the reference oscillation signal Sp are equal to each other, the frequency fo of the local oscillation signal So is given by $$fo = 100\ \text{kHz} \times N \quad \text{(ii)}$$

In this state, the condition of Eq. (i) is satisfied.

Accordingly, if the frequency division ratio N is changed by 1 each time in a range of 982 to 1187 as shown in FIG. 3, it follows that the local oscillation frequency fo is changed at an interval of 0.1 MHz between 98.2 MHz and 118.7 MHz, whereby the reception frequency fr is changed in conformity with the frequency division ratio N at an interval of 0.1 MHz in a range of 87.5 to 108.0 MHz.

Figure 2:
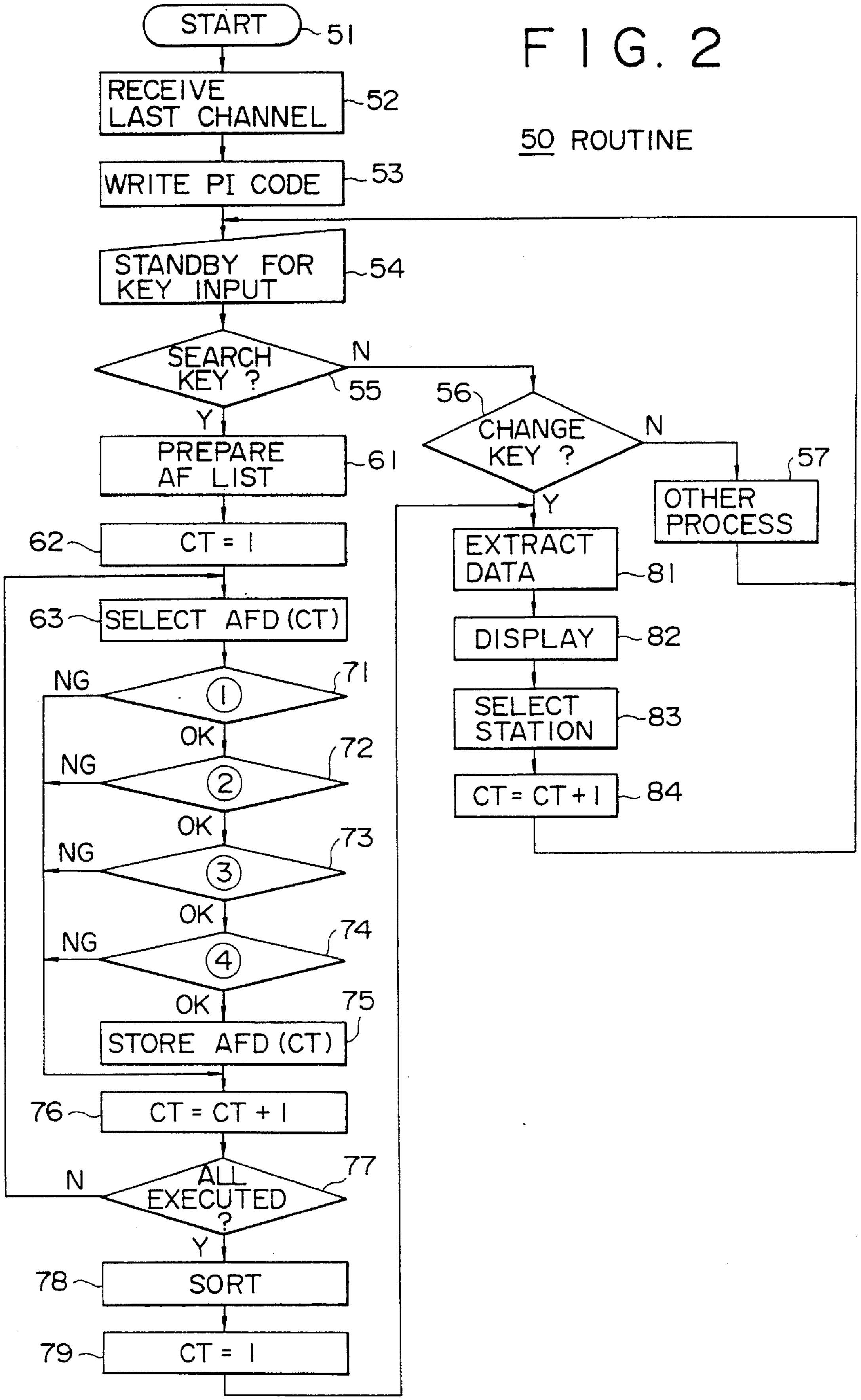
FIG. 2 is a flow chart of processing steps and contents in a routine executed in the present invention.

Further shown in FIG. 1 are a system control microcomputer 30 (e.g. general-purpose microcomputer μPD-75517 made by NEC Corporation), a CPU 31 in the microcomputer 30, a ROM 32 where a processing routine 50 of FIG. 2 for example is stored; a RAM 33 for a work area; a RAM 34 for storing various data; and ports 41 to 44. The circuits 32 to 34 and 41 to 44 are connected to the CPU 31 via a system bus 36.

The port 41 is connected to the frequency divider 12, and the frequency division ratio N is set in the frequency divider 12 by execution of an undermentioned program. The RAM 34 is rendered nonvolatile with an unshown backup battery, so that the stored data can be retained even if the power supply thereto is interrupted.

The intermediate frequency signal Si is partially outputted from the mixer 4 and then is supplied to a detector 21, which produces a field detection signal Ss whose DC level changes in accordance with the reception level of the broadcast signal Sr. The signal Ss thus obtained is supplied to an A-D converter 22 where analog-to-digital conversion is performed, and the resultant digital signal is supplied to the port 42.

The FM demodulated output of the demodulator 6 and the intermediate frequency signal Si are partially supplied to a detector 23, which then delivers a detection signal Sq that becomes "1" during reception of the broadcast signal Sr or becomes "0" during non-reception thereof. This signal Sq is supplied to the port 42.

The signals Sa and Sm from the demodulator 6 are supplied to a band pass filter 24, from which the signal Sm is outputted alone. Subsequently the signal Sm is supplied to a demodulator 25 so that the RDS data Sd is demodulated. The RDS data Sd is supplied to a decoder 26 where error correction is performed, and then the corrected data Sd is supplied to the port 42. In this stage, the decoder 26 produces an error flag signal Se which signifies the result of the error correction for the RDS data Sd. The signal Se outputted from the decoder indicates the presence or absence of any error in the RDS data Sd, and is supplied also to the port 42.

To the port 43, there are connected an up key Ku, a down key Kd, a register key Kr, a search key Ks and a change key Kc. Meanwhile, station select keys K1 to K10 are connected to the port 44.

Each of the keys Ku to K10 consists of a nonlock type push switch. The up key Ku and the down key Kd function, when depressed, to raise and lower the reception frequency fr respectively by 100 kHz with each depression.

The register key Kr is used for registering the frequency data of the broadcasting station being presently received, such as the frequency division ratio N, in a predetermined address of the RAM 33. The search key Ks is used for searching a program which is the same as the one being presently received and is broadcasted at a different frequency also, and the change key Kc is used for changing the selection to the same program of the different frequency. Each of the select keys K1 to K10 functions, when depressed, to select the broadcasting station (of frequency fr) registered in the individual key.

There are further shown a display controller 45 and a display unit 46. The display unit 46 serves to digitally display the frequencies included on the AF list, as shown in FIG. 6 for example, by manual depression of the keys by a user.

In the constitution mentioned above, the following process is performed with execution of the routine 50 of FIG. 2 by the CPU 31.

[Power on]

When the power supply is switched on, the process of the CPU 31 starts with step 51 of the routine 50. Next at step 52, the last channel data, i.e. the frequency division ratio N of the broadcasting station received finally at the preceding turn-off of the power supply, is read out from a predetermined address of the RAM 34, and then the frequency division ratio N is set in the frequency divider 12.

Therefore, when the power supply is turned on, the station received finally at the preceding turn-off is received again.

Subsequently the process of the CPU 31 advances from step 52 to step 53 where the PI code is extracted from the RDS data Sd obtained from the decoder 26, and the PI code is written in a predetermined address of the RAM 33. And at step 54, the operation is kept on standby for a key input.

[Key input, Selection of station, and Registration thereof]

If any of the keys Ku to Kc and K1 to K10 is depressed during the standby for a key input at step 54, the process advances from step 54 to step 55, where a check is executed as to whether the key input at step 54 is from the search key Ks or not. In case the result of such check is negative, the process asvances from step 55 to step 56, where a check is executed as to whether the key input at step 54 is from the change key Kc or not. And if the result of such check is negative, the process advances from step 56 to step 57.

At step 57, the process for any input such as station selection or registration other than that from the search key Ks or the change key Kc is performed in the following procedure.

[Selection of station by Key Ku or Kd]

If the key input at step. 54 is from the up key Ku or the down key Kd, the frequency division ratio N set in the frequency divider 12 from the port 54 is incremented or decremented by 1 from the present value. However, when the frequency division ratio N has reached its maximum or minimum, the next value is changed to the minimum or maximum.

Therefore a desired broadcast of any frequency can be searched and selected by depressing the key Ku or Kd. After such selection, the frequency division ratio N is written as the last channel data in a predetermined address of the RAM 34. Also the PI code is written in the RAM 33. In this manner, the broadcast of any frequency can be listened to through the loudspeaker 9.

[Registration]

If the register key Kr is depressed at step 54 together with depression of one select key Ki (where i is a numeral of 1 to 10) out of the select keys K1 to K10 after selection of any station, then the frequency division ratio N of the selected station is written in the address corresponding to the depressed key Ki.

Thus, any broadcasting station can be registered in one of the select keys K1 to K10 by the above key manipulation.

[Selection of station by select keys K1 to K10]

If any select key Ki is depressed at step 54 posterior to registration of the broadcasting station in that select key Ki, the written frequency division ratio N of the station is read out from the address of the RAM 34 corresponding to the depressed key Ki, and such ratio N is set in the frequency divider 12. After selection of the station, the frequency division ratio N is written as the input channel data in a predetermined address of the RAM 34, and also the PI code is written in the RAM 33.

Accordingly, any of the broadcasting stations registered in the select keys K1 to K10 can be selected and received by the above key manipulation. (Selection and reception by memory)

Thus, at step 57, there is executed the station selection by the up key Ku, down key Kd or select keys K1 to K10, or the registration by the register key Kr.

Upon completion of the operation at step 57, the process returns to step 54, and then a standby state for a key input is resumed.

[Search for AF station]

If the search key Ks is depressed during the key input standby at step 54 after selection of broadcasting stations, the process advances from step 54 to step 55. In this case, due to depression of the search key Ks, the process further advances from step 55 to step 61 where the AF list is extracted from the RDS data Sd and, as shown in FIG. 4A for example, the data AFD(1) to AFD(N) of N frequencies on the AF list are written in the RAM 33.

Subsequently at step 62, a software counter CT is set to 1. And at step 63, there is extracted the data AFD(CT) of the CT-th frequency out of a plurality of frequency data on the AF list (FIG. 4A) prepared in the RAM 33 at step 61, so that the broadcasting station corresponding to the extracted frequency data is selected. Since CT=1 in this case, the station corresponding to the 1st frequency data AFD(1) on the AF, list is selected.

Thereafter at step 71, a check (1) is executed to distinguish between the presence and absence of the tuning detection signal Sq and the RDS data Sd. Due to such check, it is possible to find from the presence of the tuning detection signal Sq that a broadcast is being received, and also to find from the presence of the RDS data Sd that the frequency of any station transmitting the RDS data Sd is being selected, i.e., the signal of the RDS data Sd propagated therefrom is being picked up by the receiver.

If the result of the check (1) signifies that the station transmitting the RDS data Sd is being received, the process advances from step 71 to step 72.

At step 72, a check (2) is executed as to the error flag signal Se. If any radio interference such as RF intermodulation or multipath is existent with regard to the station being selected, it is probable that some error is induced in the RDS data Sd. More specifically, in a reception state where some error is induced in the RDS data Sd which is composed of digital signal and is correctable with respect to the error., it is supposed that the definition of the demodulated audio signal Sa is inferior and not adequate for reception.

Therefore, when the result of the check (2) signifies that the error flag signal Se indicates non-existence of any error, the process advances from step 72 to step 73.

At step 73, a check (3) is executed as to the PI code. More specifically, a check is made to detect whether the PI code of the RDS data Sd relative to the broadcast being presently received is coincident or not with the PI code written in the RAM 33 at step 53 or 57, whereby it is found that the program of the station selected at step 72 is the same or not as the program of the station selected at step 52 or 57. When both programs are the same, there arises no problem with regard to the contents of the programs if the stations are switched.

In case the result of the check (3) signifies that the programs are the same (with mutual coincidence of the respective PI codes), the process advances from step 73 to step 74.

At step 74, a check (4) is executed as to the field detection signal Ss. In this case, the level of the detection signal Ss corresponds to the reception level of the broadcast waves being presently received, and the S/N or C/N is rendered higher in accordance with a rise of the reception signal level.

The check (4) is executed to find whether the level of the detection signal Ss is higher than a predetermined value. If the signal level is above the predetermined value, the process advances from step 74 to step 75, At step 75, the present frequency data AFD(CT) and the level of the detection signal Ss obtained by the check (4) are stored temporarily in the RAM 33.

Subsequently at step 76, the counter CT is incremented by 1. And next at step 77, a check is executed as to whether the process at step 71 (and steps 72 to 75) has been completed or not relative to the broadcasting stations of the entire frequency data AFD(1) to AFD(N) on the AF list written in the RAM 33. In case the result of such check is negative, the process returns to step 63 from step 77.

If the result of the check (1) at step 71 signifies no selection of any station transmitting the RDS data Sd therefrom, the process advances from step 71 to step 76 while skipping over steps 72 through 74. Similarly, if the results of the checks (2) to (4) at steps 72 to 74 are negative, the process advances to step 76 while skipping over steps 72 through 74.

The check (1) is executed with respect to the stations of the entire frequency data AFD(1) to AFD(N) on the AF list written in the RAM 33, and then the checks (2) to (4) are executed in the same manner. Each of such checks (2) to (4) is executed merely when the result of the preceding check is affirmative. And the frequency data AFD(CT) and the levels of the detection signals Ss thereof having passed the entire checks (1) to (4) are stored sequentially in the RAM 33. FIG. 4B shows an example where four of the broadcasts of the frequency data AFD(1) to AFD(N) on the AF list have passed the checks (1) to (4) and the data thereof are retained in the RAM 33.

Upon completion of the checks with respect to the entire frequency data AFD(1) to AFD(N) on the AF list, the process advances from step 77 to step 78, where the frequency data (FIG. 4B) stored in the RAM 33 at step 75 are sorted.

The sorting operation is performed in such a manner that, as shown in FIG. 5 for example, the levels of the field detection signals Ss checked at step 74 are arranged to be sequential and also that the frequency data of the maximum signal level is placed at the top of the sequence.

Upon completion of such sorting operation, the counter CT is set to 1, and then the process advances to step 81.

At step 81, there is extracted the CT-th frequency data from the top of the entire frequency data (FIG. 5) in the RAM 33, i.e., the 1st data AFD(5) since CT=1 in this example. Subsequently at step 82, the frequency data AFD(i) extracted at step 81 and the count value CT are supplied to the display controller 45, and then the frequency represented by such data AFD(i) and the count value CT are displayed digitally on the display unit 46.

In this exemplary case where AFD(i)=AFD(5) and CT=1, characters "88.5 MHz" of the frequency represented by the data AFD(5) and characters "BEST 1" are displayed as shown in FIG. 6A. Namely, in this case, such displayed contents indicate that the level of the detection signal Ss is the maximum at the above frequency and also that it is the best of all.

Subsequently at step 83, there is selected the broadcasting station of the CT-th frequency data AFD(i) from the top of the entire frequency data (FIG. 5) in the RAM 33, i.e., the station displayed on the display unit 46. In this example, the station of the frequency data AFD(5) is selected.

Next at step 84, the counter CT is incremented by 1. (The value CT is changed to 1 when it has exceeded the number of the frequency data remaining in the RAM 33, i.e. 4 in this example.) Subsequently the process returns to step 54, and the operation is kept on standby again for a key input.

Accordingly, in this state, there is selected the station of the frequency at which the level of the detection signal Sd is the maximum, and the broadcast received from such station is outputted from the loudspeaker 9.

The receiver can be so contrived that, during the process from step 55 to step 82, muting can be applied so as not to emit any sound from the loudspeaker 9, thereby preventing generation of noise during such operation.

[Change of AF station]

If the change key Kc is depressed in the key input standby state at step 54, the selected broadcasting station is changed to another station of the same program searched at steps 61 to 84.

There may occur slight radio interference which is not eliminable by the checks (1) through (4) even when the level of the detection signal Sd is the maximum at the selected frequency, and the broadcast of such selected frequency may not be exactly adequate for reception. The change key Kc is depressed in such a case.

Then the process advances from step 54 through steps 55 and 56 to step 81. In this case, the count value CT is 2.

Therefore at step 81, the 2nd data AFD(1) in the RAM 33 is extracted therefrom and, subsequently at step 82, as shown in FIG. 6B, characters "99.1 MHz" of the frequency represented by such data AFD(1) and characters "BEST 2" of the count value CT are displayed on the display unit 46. And at step 83, the station of the frequency represented by the data AFD(1) is selected.

Thereafter at step 84, the count value CT is incremented by 1, and then the operation is kept on standby for a key input.

Subsequently the process of steps 81 to 84 is repeated each time the change key Kc is depressed, and simultaneously the count value CT is incremented. Accordingly, the displayed contents on the display unit 46 are changed sequentially and repeatedly as shown in FIGS. 6A to 6D with each depression of the change key Kc, and simultaneously the reception frequency is changed each time to the one being displayed.

Thus, it becomes possible for the listener to select the auditorily best broadcast in practical reception by depressing the change key Kc.

In the embodiment mentioned above, the search key Ks and the change key Kc are provided independently of each other. However, such keys may be mutually combined to constitute a single key. In such a modification, first the process at steps 61 to 84 of the routine 50 in FIG. 2 is performed by manipulating the keys, and the broadcast of one frequency, at which the reception signal level is the maximum out of the detection signals sorted sequentially in the order of the levels, is selected and received at step 83. And thereafter the process at steps 81 to 84 is repeated with each depression of the key so that the broadcasts are received selectively in conformity with the order of the reception signal levels.

Hereinafter another embodiment of the present invention will be described with reference to FIG. This embodiment is a modification of the receiver shown in FIG. 1, wherein the search key Ks, the display controller 45 and the display unit 46 mentioned above are removed, and the CPU 31 is so constituted as to perform a routine 100 of FIG. 7. In this embodiment, the routine is simplified to ensure a sufficient margin in the processing capability of the microcomputer 30. In FIG. 7, steps corresponding to those in FIG. 2 are numbered consecutively with addition of 100, and a detailed explanation of each step is omitted here. When any key input enters at step 154 during selection of a broadcasting station after the power supply is switched on, a check is executed to find whether it is the change key Kc or not. And if the result of such check is negative, the process advances from step 156 to step 157 to perform station selection or registration by the keys Ku and Kd or selective reception by the keys K1 to K10. When the change key Kc is depressed in the key input standby state at step 154 during selection of a desired station, the process advances to steps 161 to 178.

Upon completion of the checks with regard to the entire frequency data AFD(1) to AFD(N) on the AF list shown in FIG. 4, the process advances from step 177 to step 178, where the frequency data stored in the RAM 33 at step 175 are sorted.

The sorting operation is performed in such a manner that, as shown in FIG. 5 for example, the levels of the field detection signals Ss checked at step 174 are arranged to be sequential and also that the frequency data of the maximum signal level is placed at the top of the sequence.

Upon completion of such sorting operation, the process advances to step 183 where there is extracted the frequency data at the top of the sorted result (FIG. 5) obtained at step. 178, i.e., the frequency data AFD(MAX) at which the level of the detection signal Ss is the maximum, and the frequency division ratio N of the frequency divider 12 is set to the frequency represented by the data AFD(MAX). Accordingly, there is selectively received, out of the result sorted at step 178, the station of the frequency at which the level of the detection signal Ss is the maximum.

Thereafter the process returns to step 154. At this time, the PI code of the RDS data Sd and the frequency division ratio N are written in predetermined addresses of the RAMs 33 and 34.

Thus, according to the present invention, any of stations broadcasting the same program can be selectively received by utilizing the AF list with an advantage that, when one station of the frequency data AFD(CT) on the AF list is to be received, the stations of the frequencies having passed the entire checks (1) to (4) are rendered selectable, and then the station of the maximum reception signal level is first selected, whereby the receiver can be tuned in with certainty to the station in the best reception state.

If merely the checks (3) and (4) alone are executed for example, in case the broadcast waves selected in conformity with the AF list are harmfully affected by interference such as RF intermodulation or multipath, then such waves are permitted to pass the checks (3) and (4), so that some station in an unsatisfactory reception state may be selected as a result. However, according to the above embodiment, such a disadvantage can be eliminated.

Further according to the present invention, if there exists any radio interference in the selected broadcast due to some reason, one broadcast of the frequency at the maximum reception level can be selected by depressing the change key Kc out of the frequencies having passed the entire checks (1) to (4), whereby the receiver can be tuned in to the auditorily best broadcast for the listener in practical reception.

In addition, the checks (1) to (4) are executed sequentially in this order with regard to the reception state of the station of the frequency data AFD(CT) on the AF list, and if the result of any check is negative, the ensuing checks are skipped over and then the reception state of the next station of the frequency data AFD(CT+1) is checked. Therefore it becomes possible to search the station in the best reception state within a short time, hence achieving fast selection of the optimal station.

What is claimed is:

1. A radio frequency receiver comprising:

receiving means for receiving a broadcast signal;

tuning means for tuning said receiver to a current broadcast signal of a specified frequency;

said tuning means comprises a tuner;

decoding means for decoding signal characteristic data from said current broadcast signal received by said receiving means;

first memory means for storing said decoded signal characteristic data;

scanning means for scanning alternate frequencies identified by said decoded signal characteristic data while said tuning means for tuning said receiver to a current broadcast signal of a specified frequency is temporarily interrupted from tuning said receiver to said current broadcast of a Specified frequency;

said scanning means comprises said tuner;

detecting means for detecting alternate broadcast signals broadcast on said scanned alternate frequencies identified by said signal characteristic data;

first comparing means for comparing signal characteristic data of a detected alternate broadcast signal with the characteristic data decoded from said current broadcast signal which is stored in said first memory means;

second comparing means for comparing the field strength of a detected alternate broadcast signal with the field strength of said current broadcast signal;

second memory means for storing the frequency and signal characteristic data of a detected alternate broadcast signal where said detected alternate broadcast signal has signal characteristic data identical to the characteristic data decoded from said current broadcast signal which is stored in said first memory means, and the field strength of said detected alternate broadcast signal is greater than the field strength of said current broadcast signal;

means for sorting said alternate frequencies stored in said second memory means in an order from alternate frequency which carries the alternate broadcast signal of greatest field strength to alternate frequency which carries the alternate broadcast signal of least field strength; and means for selectively tuning said receiver to said alternate frequencies stored in said second memory means in a successive order from alternate frequency which carries an alternate broadcast signal of greatest field strength to an alternate frequency which carries an alternate broadcast signal of least field strength.

2. A radio frequency receiver according to claim 1 wherein said signal characteristic data comprises alternate frequency list information identifying alternate frequencies on which program material identical to that broadcast on said current broadcast signal is broadcast.

3. A radio frequency receiver according to claim 1 wherein said signal characteristic data further comprises program identification code information identifying the type of program material broadcast by said current broadcast signal.

4. A radio frequency receiver comprising:

receiving means for receiving a broadcast signal;

tuning means for tuning said receiver to a current broadcast signal of a specified frequency;

said tuning means comprises a tuner;

decoding means for decoding signal characteristic data from said current broadcast signal received by said receiving means;

said signal characteristic data comprises an alternate frequency list which identifies alternate frequencies on which program material identical to that broadcast on said current broadcast signal is broadcast and program identification code information identifying the type of program material broadcast by said current broadcast signal;

first memory means for storing said decoded signal characteristic data;

scanning means for scanning alternate frequencies identified by said alternate frequency list while said tuning means is temporarily interrupted from tuning said receiver to said current broadcast signal;

said scanning means comprises said tuner;

detecting means for detecting alternate broadcast signals on said scanned alternate frequencies identified by said alternate frequency list;

first comparing means for comparing signal characteristic data of a detected alternate broadcast signal with the characteristic data decoded from said current broadcast signal which is stored in said first memory means;

second comparing means for comparing the field strength of a detected alternate broadcast signal with the field strength of said current broadcast signal;

second memory means for storing the frequency and program identification code information of a detected alternate broadcast signal where said detected alternate broadcast signal has signal characteristic data identical to said current broadcast signal characteristic data stored in said first memory means, and the field strength of said detected alternate broadcast signal is greater than the field strength of said current broadcast signal;

means for sorting said alternate frequencies stored in said second memory means in an order from alternate frequency which carries the alternate broadcast signal of greatest field strength to alternate frequency which carries the alternate broadcast signal of least field strength; and means for selectively tuning said receiver to said alternate frequencies stored in said second memory means in a successive order from alternate frequency which carries the alternate broadcast signal of greatest field strength to an alternate frequency which carries an alternate broadcast signal of least field strength.

* * * * *